(12) United States Patent
Smith et al.

(10) Patent No.: US 7,799,455 B2
(45) Date of Patent: Sep. 21, 2010

(54) BATTERY SEPARATOR AND METHOD OF MAKING SAME

(75) Inventors: Robert M. Smith, Southbury, CT (US); Curtis G. Lorenzen, New Milford, CT (US); Terence Grant Lee Soon, Danbury, CT (US)

(73) Assignee: The Gillette Company, Boston, MA (US)

( * ) Notice: Subject to any disclaimer, the term of this patent is extended or adjusted under 35 U.S.C. 154(b) by 850 days.

(21) Appl. No.: 11/564,556

(22) Filed: Nov. 29, 2006

(65) Prior Publication Data

US 2008/0124621 A1    May 29, 2008

(51) Int. Cl.
*H01M 2/18* (2006.01)
*H01M 6/06* (2006.01)

(52) U.S. Cl. .................. 429/133; 429/129; 429/164

(58) Field of Classification Search ......... 429/129–147, 429/163–165, 247–255
See application file for complete search history.

(56) References Cited

U.S. PATENT DOCUMENTS

| | | | | |
|---|---|---|---|---|
| 1,654,038 | A | * | 12/1927 | Deibel .................. 429/133 |
| 3,089,914 | A | * | 5/1963 | Carmichael et al. ......... 429/133 |
| 3,951,687 | A | | 4/1976 | Takamura et al. |
| 3,953,241 | A | | 4/1976 | Langer et al. |
| 4,037,033 | A | | 7/1977 | Takamura et al. |
| 4,262,061 | A | | 4/1981 | Rogers |
| 4,273,840 | A | | 6/1981 | Machi et al. |
| 4,277,547 | A | | 7/1981 | Verzwyvelt |
| 4,361,632 | A | | 11/1982 | Weber et al. |
| 4,620,665 | A | | 11/1986 | McSherry |
| 4,629,666 | A | | 12/1986 | Schlaikjer |
| 4,669,183 | A | * | 6/1987 | Duncan et al. ............. 29/623.1 |
| 4,734,344 | A | | 3/1988 | Choi |
| 4,853,101 | A | | 8/1989 | Hruska et al. |
| 5,075,958 | A | * | 12/1991 | Kelemen et al. ............. 29/730 |
| 5,176,968 | A | | 1/1993 | Blasi et al. |
| 5,208,120 | A | * | 5/1993 | Winger ........................ 429/133 |
| 5,213,722 | A | | 5/1993 | Iwasaki et al. |
| 5,298,348 | A | | 3/1994 | Kung |
| 5,336,573 | A | | 8/1994 | Zuckerbrod et al. |
| 5,342,709 | A | | 8/1994 | Yahnke et al. |
| 5,389,471 | A | | 2/1995 | Kung |
| 5,674,639 | A | * | 10/1997 | Urry .......................... 429/122 |
| 5,824,434 | A | | 10/1998 | Kawakami et al. |
| 5,948,557 | A | | 9/1999 | Ondeck et al. |

(Continued)

FOREIGN PATENT DOCUMENTS

GB    1 371 979    10/1974

(Continued)

OTHER PUBLICATIONS

USPTO Translation of JP 58-45043.*

*Primary Examiner*—Dah-Wei D Yuan
*Assistant Examiner*—Jacob Buchanan
(74) *Attorney, Agent, or Firm*—Fish & Richardson P.C.

(57) ABSTRACT

An alkaline battery includes a cathode, an anode, a separator between the anode and the cathode, and an alkaline electrolyte contacting the anode and the cathode. The separator includes a first generally cylindrical body. The first generally cylindrical body includes a first wall section, a second wall section, and a first folded section. The first folded section is radially outwardly disposed from the first wall section.

15 Claims, 6 Drawing Sheets

U.S. PATENT DOCUMENTS

| | | |
|---|---|---|
| 6,159,634 A | 12/2000 | Yen et al. |
| 6,270,833 B1 | 8/2001 | Yamashita et al. |
| 6,306,545 B1 | 10/2001 | Carlson et al. |
| 6,447,958 B1 | 9/2002 | Shinohara et al. |
| 6,488,982 B1 | 12/2002 | Nitsche et al. |
| 6,495,292 B1 | 12/2002 | Yen |
| 6,541,160 B2 | 4/2003 | Cheiky et al. |
| 6,558,849 B2 | 5/2003 | Cheiky et al. |
| 6,794,082 B2 | 9/2004 | Mori et al. |
| 6,828,061 B2 | 12/2004 | Janmey |
| 7,052,794 B2 | 5/2006 | Nakata et al. |
| 7,066,970 B2 | 6/2006 | Gilicinski et al. |
| 2002/0182511 A1 | 12/2002 | Cheiky et al. |
| 2004/0068863 A1 | 4/2004 | Cintra et al. |
| 2005/0058903 A1* | 3/2005 | Eylem et al. ............. 429/220 |

FOREIGN PATENT DOCUMENTS

| | | |
|---|---|---|
| JP | 49-119116 | 11/1974 |
| JP | 58-45043 A * | 3/1983 |
| WO | WO 2006/017454 A2 | 2/2006 |

* cited by examiner

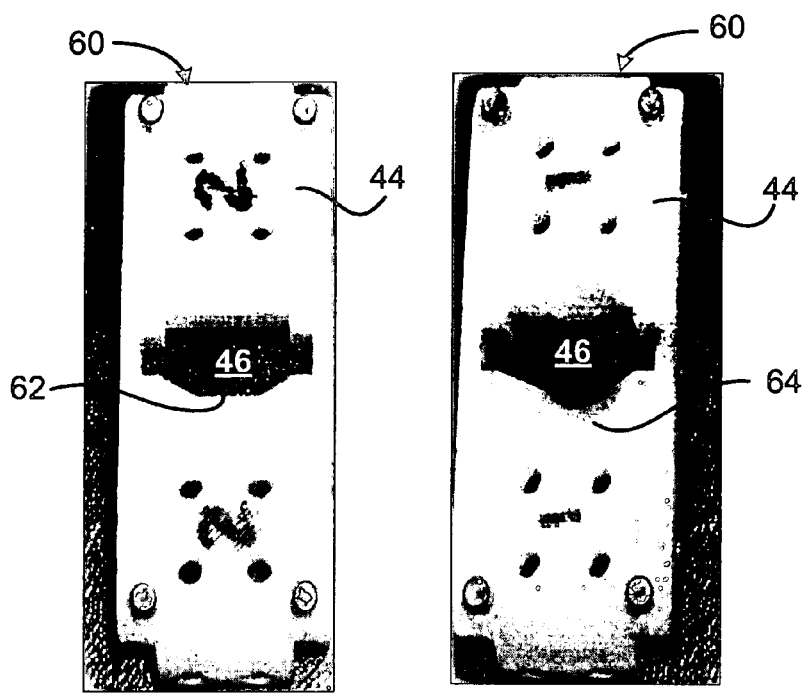
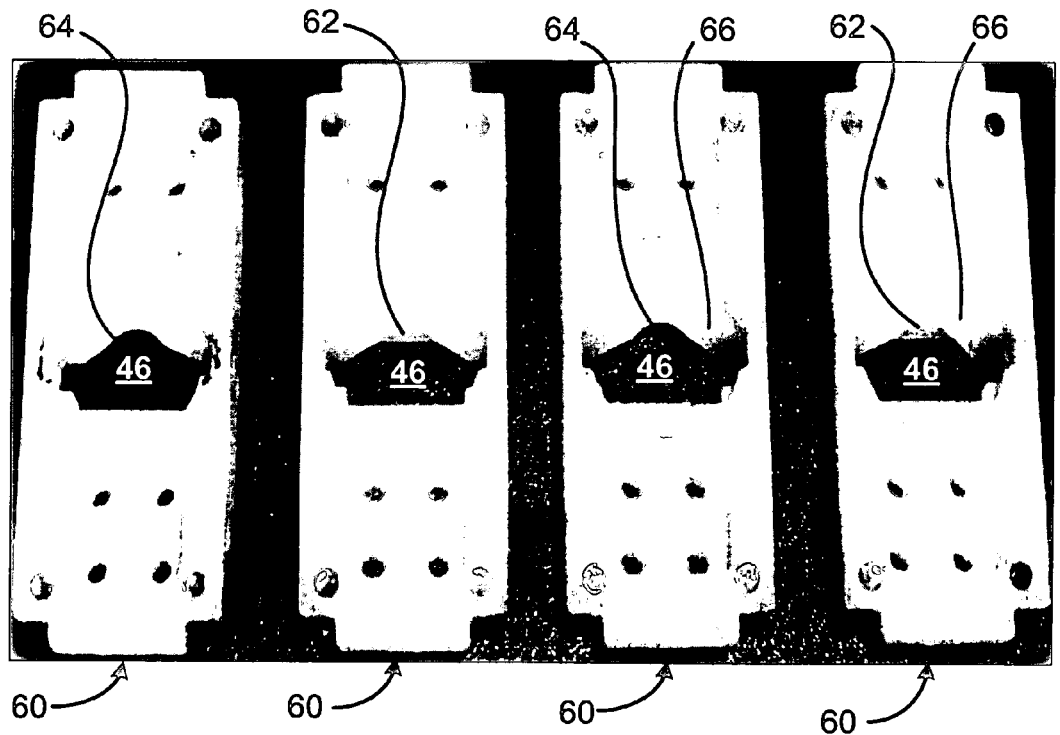
FIG. 6A  FIG. 6B  FIG. 6C  FIG. 6D  FIG. 6E  FIG. 6F

BATTERY SEPARATOR AND METHOD OF MAKING SAME

TECHNICAL FIELD

This invention relates to batteries, and more particularly to a separator for a battery.

BACKGROUND

Batteries, such as alkaline batteries, are commonly used as electrical energy sources. Generally, a battery contains a negative electrode (anode) and a positive electrode (cathode). The anode contains an active material (e.g., zinc particles) that can be oxidized; and the cathode contains an active material (e.g., manganese dioxide) that can be reduced. The active material of the anode is capable of reducing the active material of the cathode. In order to prevent direct reaction of the active material of the anode and the active material of the cathode, the electrodes are electrically isolated from each other by a separator.

When a battery is used as an electrical energy source in a device, such as a cellular telephone, electrical contact is made to the electrodes, allowing electrons to flow through the device and permitting the respective oxidation and reduction reactions to occur to provide electrical power. An electrolyte in contact with the electrodes contains ions that flow through the separator between the electrodes to maintain charge balance throughout the battery during discharge.

SUMMARY

An alkaline battery is disclosed that includes a cathode, an anode, a separator between the anode and the cathode, and an alkaline electrolyte contacting the anode and the cathode. The separator includes a first generally cylindrical body. The first generally cylindrical body includes a first wall section, a second wall section, and a first folded section. The first folded section is radially outwardly disposed from the first wall section.

In some embodiments, the first folded section is radially inwardly disposed from the second wall section. The first generally cylindrical body may also include a second folded section. In some embodiments, the second folded section is also radially outwardly disposed from at least one of the first and second wall sections. In one embodiment, the second folded section is radially outwardly disposed from one of the wall sections and radially inwardly disposed from the other wall section.

In some embodiments, the first and second folded sections are both radially outwardly disposed from the first wall section and radially inwardly disposed from the second wall section.

In some embodiments, the first generally cylindrical body includes a closed end. The first folded section may be folded substantially perpendicular to the plane of the substantially closed end.

In some embodiments, the first generally cylindrical body consists of a single continuous piece of material.

In some embodiments, the separator includes a second generally cylindrical body surrounding the first generally cylindrical body. The first generally cylindrical body may include a continuous piece of porous material. The second generally cylindrical body may include a continuous piece of non-porous material.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 6a-6f depict different embodiments of a face plate for the die.

Like reference symbols in the various drawings indicate like elements.

DETAILED DESCRIPTION

Figure 1:
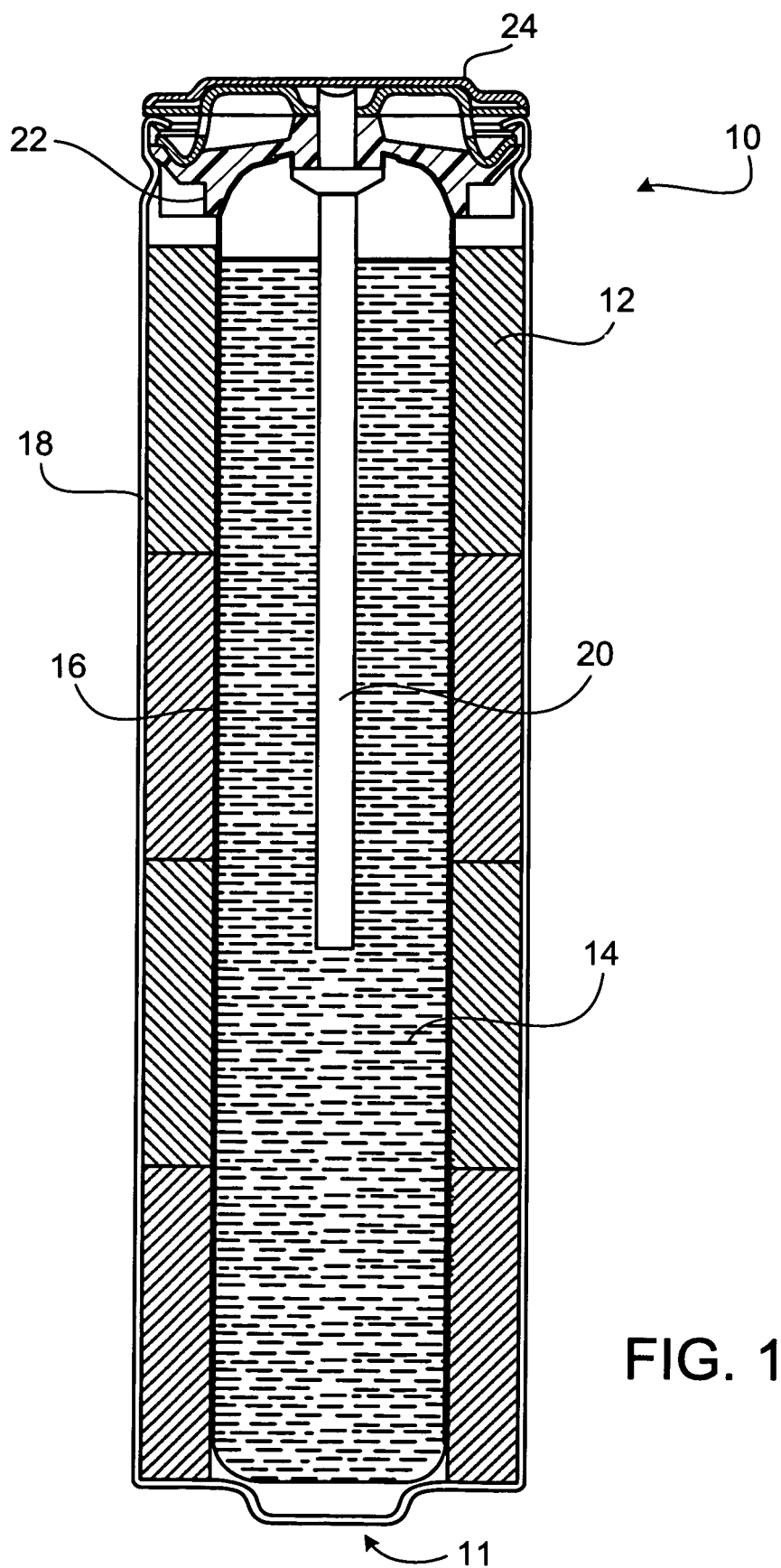
FIG. 1 is a cross-sectional view of an embodiment of a battery.

Referring to FIG. 1, a battery 10 includes a cylindrical housing 18 containing a cathode 12, an anode 14, and a separator 16 between the cathode and anode. Cathode 12 includes an active cathode material, and anode 14 includes an active anode material. Battery 10 also includes a current collector 20, a seal 22, and a metal top cap 24, which serve as the negative terminal for the battery. Cathode 12 is in contact with housing 18, and the positive terminal of battery 10 is at the end of the battery opposite from the negative terminal. An electrolyte is dispersed throughout battery 10. In order to prevent direct reaction of the active material of the anode 14 and the active material of the cathode 12, the electrodes are electrically isolated from each other by a separator 16.

Separator 16 has a generally cylindrical shape. Separator 16 may include one closed end. Separator 16 may include one or more generally cylindrical bodies concentrically disposed within each other.

In one embodiment, separator 16 includes a porous inner generally cylindrical body and a non-porous outer generally cylindrical body. The porous inner generally cylindrical body will be put into contact with the anode 14. The non-porous outer generally cylindrical body will be put into contact with the cathode 12. The inner generally cylindrical body is concentrically disposed within the outer generally cylindrical body. The inner generally cylindrical body is rotated by about 90 degrees with respect to the outer generally cylindrical body. Each generally cylindrical body may be formed from a substantially flat sheet of continuous material into a substantially cylindrically shaped body of separator material by curving, bending and/or folding.

Figure 2:
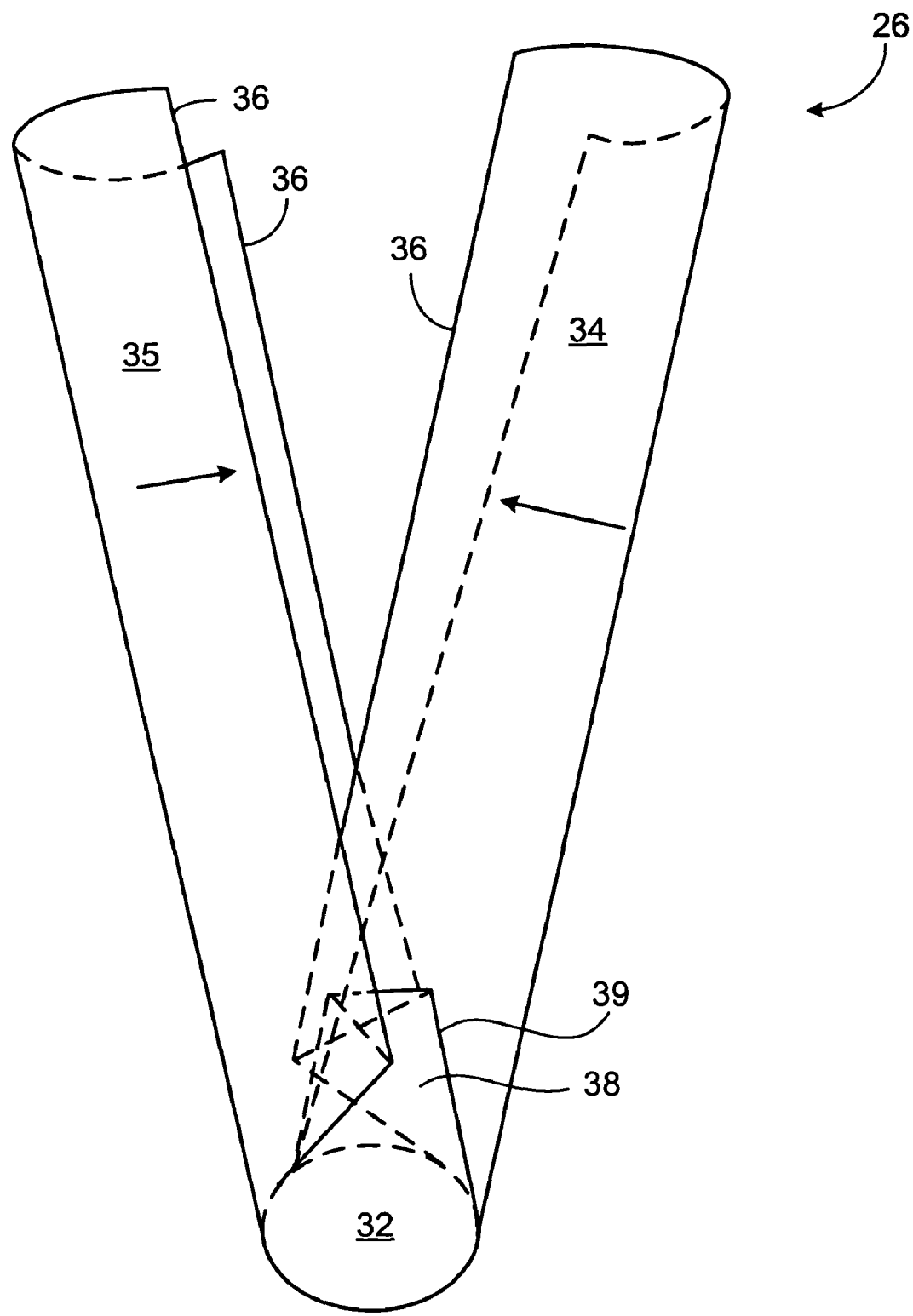
FIG. 2 is a schematic view of a partially opened inner generally cylindrical body part of a separator.

FIG. 2 depicts a partially opened generally cylindrical body 26 of a separator 16. FIG. 2 shows the generally cylindrical body 26 in a partially opened form to better depict the different structures. In some embodiments, the generally cylindrical body 26 is used as the inner most generally cylindrical body. Other embodiments include the generally cylindrical body 26 as an intermediate generally cylindrical body or as the outer most generally cylindrical body. The generally cylindrically body 26 includes a first wall section 34, a second wall section 35, and a first folded section 38.

Each wall section 34 and 35 is bowed. Each wall section 34 and 35 has a cross section approximating a semi-circle. When in a closed state, the sides 36 of each wall section 34 and 35 at least abut to form the side wall of the generally cylindrical body. In some embodiments, the sides 36 of each wall section 34 and 35 overlap. The sides of the wall sections 34 and 35 may overlap by at least 1 mm, or by about 3 mm. The wall sections 34 and 35 remain overlapping when positioned within the battery 10 by the presence of the cathode 12 material, which prevents the generally cylindrical body 26 from opening up.

The first folded section 38 is radially outwardly disposed from the first wall section 34. The first folded section 38 is radially inwardly disposed from the second wall section 35. In some embodiments, the generally cylindrical body 26 includes a second folded section (not shown). The second folded section may be opposite to the first folded section 38. The second folded section may be radially outwardly disposed from one of the first and the second wall sections 34 and 35. The second folded section may also be radially inwardly disposed from the other of the wall sections 34 or 35. In some embodiments, the first and second folded sections are both radially outwardly disposed from the first wall section 34 and both radially inwardly disposed from the second wall section 35.

Each folded section may be perpendicular to the plane of the closed end 32. Each folded section may be defined by side edges 39. Each side edge is defined by a fold 39' (shown in FIG. 3). In some embodiments, the side edge 39 of the first folded section 38 forms an angle of between 45 and 60 degrees with the plane of the closed end 32. Each side edge 39 of each folded section may also form an angle of between 45 and 60 degrees with the plane of the closed end 32.

Although the embodiment shown in FIG. 2 depicts the generally cylindrical body 26 with the folded section 38 radially outwardly disposed from the first wall section 34 and radially inwardly disposed from the second wall section 35, embodiments where one or both of the folded sections are radially outwardly disposed from both wall sections 34 and 35 are also contemplated.

Figure 3:
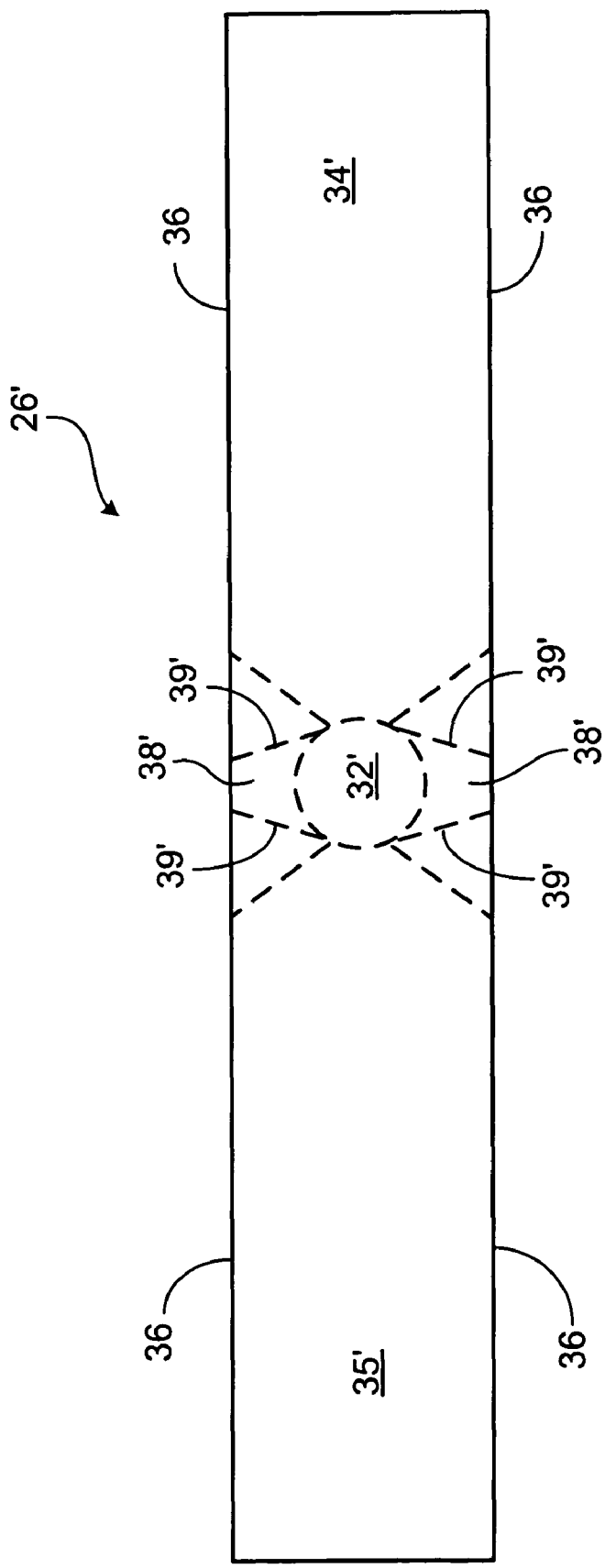
FIG. 3 depicts a representative continuous piece of separator material prior to shaping the separator material into a generally cylindrical body part of a separator.

The generally cylindrical body 26 is formed by shaping an elongated substantially flat sheet of continuous separator material 26' as shown in FIG. 3. The dashed lines in FIG. 3 represent approximate fold lines. In some embodiments, the elongated substantially flat sheet of separator material 26' is rectangular. The substantially closed end 32 is formed from an approximately circular middle section 32' of the elongated substantially flat sheet of continuous separator material 26', and the substantially cylindrical sides of the separator 16 are formed by the remaining material surrounding the approximately circular middle section 32'. In particular, in some embodiments, the majority of the cylindrical sides of the separator layer are formed by at least two wall sections 34 and 35. The wall sections 34 and 35 formed from the elongated ends 34' and 35' of the substantially flat sheet of separator material 26'. The cylindrical sides also include folded sections 38 made up of side middle portions 38' of the elongated substantially flat sheet of separator material 26', which are adjacent to the approximately circular middle section 32'. The side edges 39 of each folded section 38 is defined by folds 39'.

Suitable materials for the separator include paper, polypropylene (e.g., non-woven polypropylene or microporous polypropylene), polyethylene, polytetrafluoroethylene, a polyamide (e.g., a nylon), a polysulfone, a polyvinyl chloride, or combinations thereof. Suitable separator papers include PDM PA25A paper; BH40, manufactured by Nippon Kodishi Corporation, and DURALAM DT225AC paper. Separator 16 could also include a generally cylindrical body of cellophane combined with a generally cylindrical body of a non-woven material. The non-woven material can include, for example, polyvinyl alcohol and/or rayon. Each of these materials is usually available as continuous sheets of flat material, which is then formed into a generally cylindrical body prior to use as part of separator 16. Each flat continuous piece of separator material may include various bonded sub-layers of different materials. Generally cylindrical bodies making up the separator 16 may be porous or non-porous.

For example, an AA battery may include an inner porous or non-porous generally cylindrical body and an outer non-porous generally cylindrical body. The inner generally cylindrical body may be formed from an approximately rectangular continuous piece of porous separator material having a length of between 99.40 mm and 101.60 mm and a width of between 15.00 mm and 15.50 mm. The inner generally cylindrical body can be made of PDM PA25A paper. The paper used for the inner generally cylindrical body may have a thickness of about 125 microns. In one embodiment, however, the generally cylindrical body 26 is made of a thinner non-porous paper designated BH40, manufactured by Nippon Kodishi Corporation. The BH40 paper has a thickness of approximately 40 microns, a tensile strength of 38 N/15 mm, and a basis weight of 26 $g/m^2$. Implementing the separator design as described may allow for the practical use of this thinner paper without significant creasing, wrinkling, tearing, or leakage of anode material past the separator. The paper used for any separator inner generally cylindrical body in any size battery may have a thickness of less than 300 microns.

The outer generally cylindrical body may be formed from an approximately rectangular continuous piece of non-porous material having a length of between 100.45 mm and 102.65 mm and a width of between 16.00 mm and 16.50 mm. The outer generally cylindrical body can be made from DURALAM DT225AC, BH40, or BB40 paper as examples. The thickness and basis weight of DT225 is 90 microns and 57 $g/m^2$ bor BH40 it is 40 microns and 26 $g/m^2$. For BB40 it is 40 microns and 27 $g/m^2$. The inner generally cylindrical body is disposed concentrically within the outer generally cylindrical body. The shape of the outer paper may have folded sections inwardly positioned with respect to the wall sections. In other embodiments, the folded sections of the outer paper are intermediately disposed or outwardly disposed from the wall sections. In some embodiments, both the inner and outer generally cylindrical bodies are shaped as shown in FIG. 2. The inner generally cylindrical body may be rotationally offset from the outer generally cylindrical body such that the wall sections are not aligned. The inner and outer generally cylindrical bodies may be rotationally offset by at least 30 degrees. In some embodiments, the outer and inner generally cylindrical bodies may be rotationally offset by about 90 degrees.

The placement of the folded section 38 of the generally cylindrical body 26 away from the inside of the inner generally cylindrically body 26 (thus having folded sections that are radially outwardly disposed from at least one of the wall sections 34 or 35) results in a battery 10 less likely to short because anode material 14 is less likely to fall through a passage formed through the folded section 38 and make contact with the cathode material during a filling operation. Furthermore, this arrangement may allow for the use of new thinner separator materials as described above. In addition, it may relieve concerns about separator swelling, especially in the folded sections (e.g., 38), which would result in the closing off of the anode cavity leading to poor bottom fill of the anode and result in a leakage path for the anode material to migrate past the inner layer though a passage formed in a folded section 38.

Figure 4:
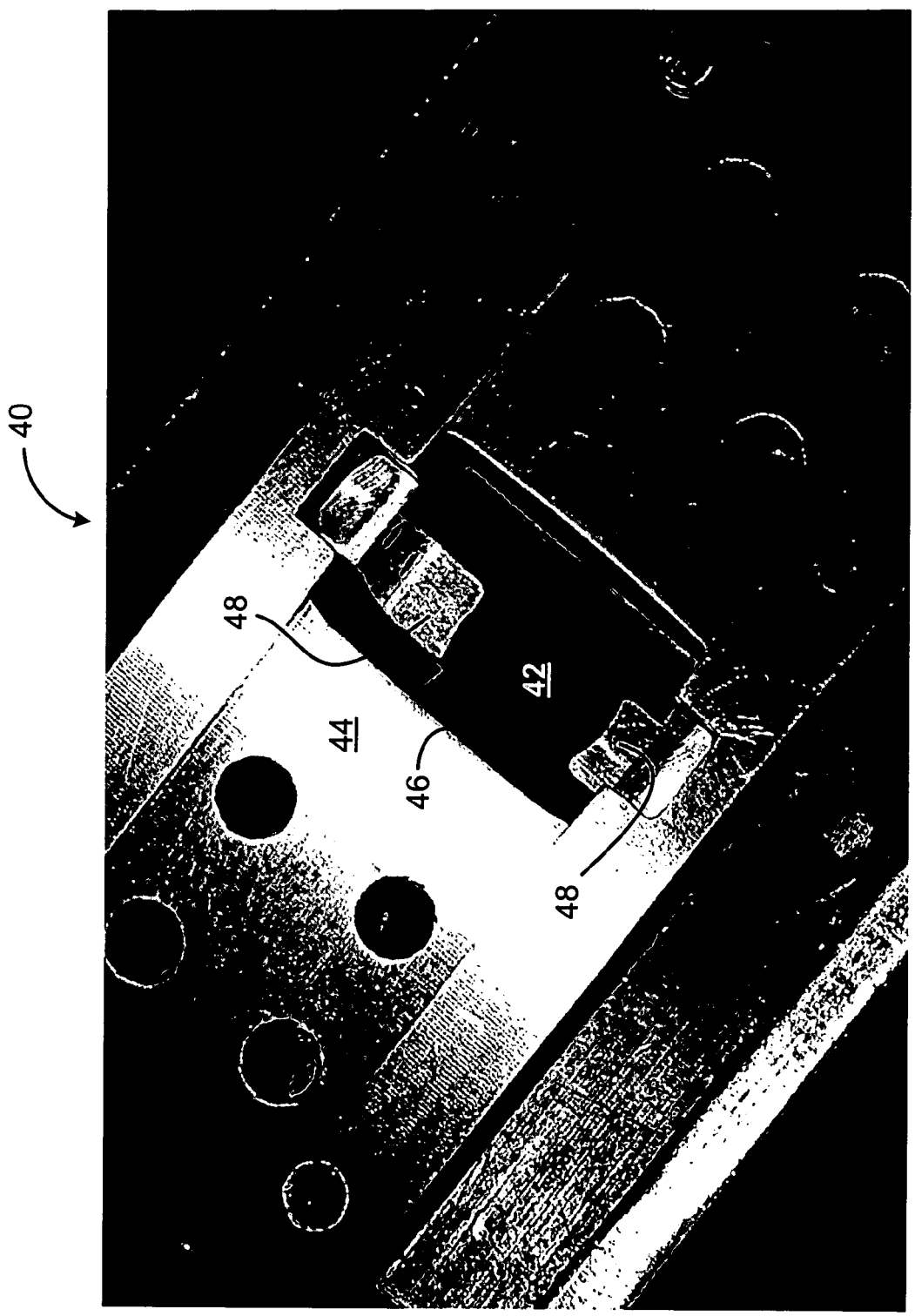
FIG. 4 is a schematic view of a die for shaping a continuous piece of material into a generally cylindrical body of a separator.

FIG. 4 depicts a die 40 defining a substantially cylindrical void 42 corresponding to the desired generally cylindrical outer shape of a generally cylindrical body 26 of a separator 16. The die 40 includes a face 44 that has an elongated bore 46 disposed above the substantially cylindrical void 42. The die also includes two folding fingers 48 which partially define the substantially cylindrical void 42. To form a generally cylindrical body 26 of a separator 16, an elongated continuous piece of separator material 26' (such as that show in FIG. 3) is placed over the face of the bore with a central portion 32' of the elongated continuous piece of separator material 26' positioned over the elongated bore 46. The length of the elongated continuous piece of separator material 26' should be approximately perpendicular to the length of the bore 46. A mandrel (not shown) having a substantially cylindrical shape corresponding the desired generally cylindrical inner shape of the generally cylindrical body 26 is pressed against the central portion 32' of the elongated continuous piece of separator material 26' to push the piece of separator material 26' into the substantially cylindrical void 42 of the die 40. As the separator material 26' is pushed though the elongated bore 46, the elongated sides 34' bend upward, forming the separator material into an approximate U-shape. The folding fingers 48 further cause middle side sections 38' to fold into folded sections 38. The shape of the die is further configured such that a first elongated side 34' is pressed against the side of the mandrel forming a first wall section 34, then the folded sections 38 are formed on an exterior of the first wall section 34, then the second elongated side 35' is pressed against the mandrel to form the second wall section 35 radially outwardly disposed from both the first wall section 34 and both folded sections 38. The folded sections 38 are therefore radially outwardly disposed from the first wall section 34 and radially inwardly disposed from the second wall section 35.

Figure 5:
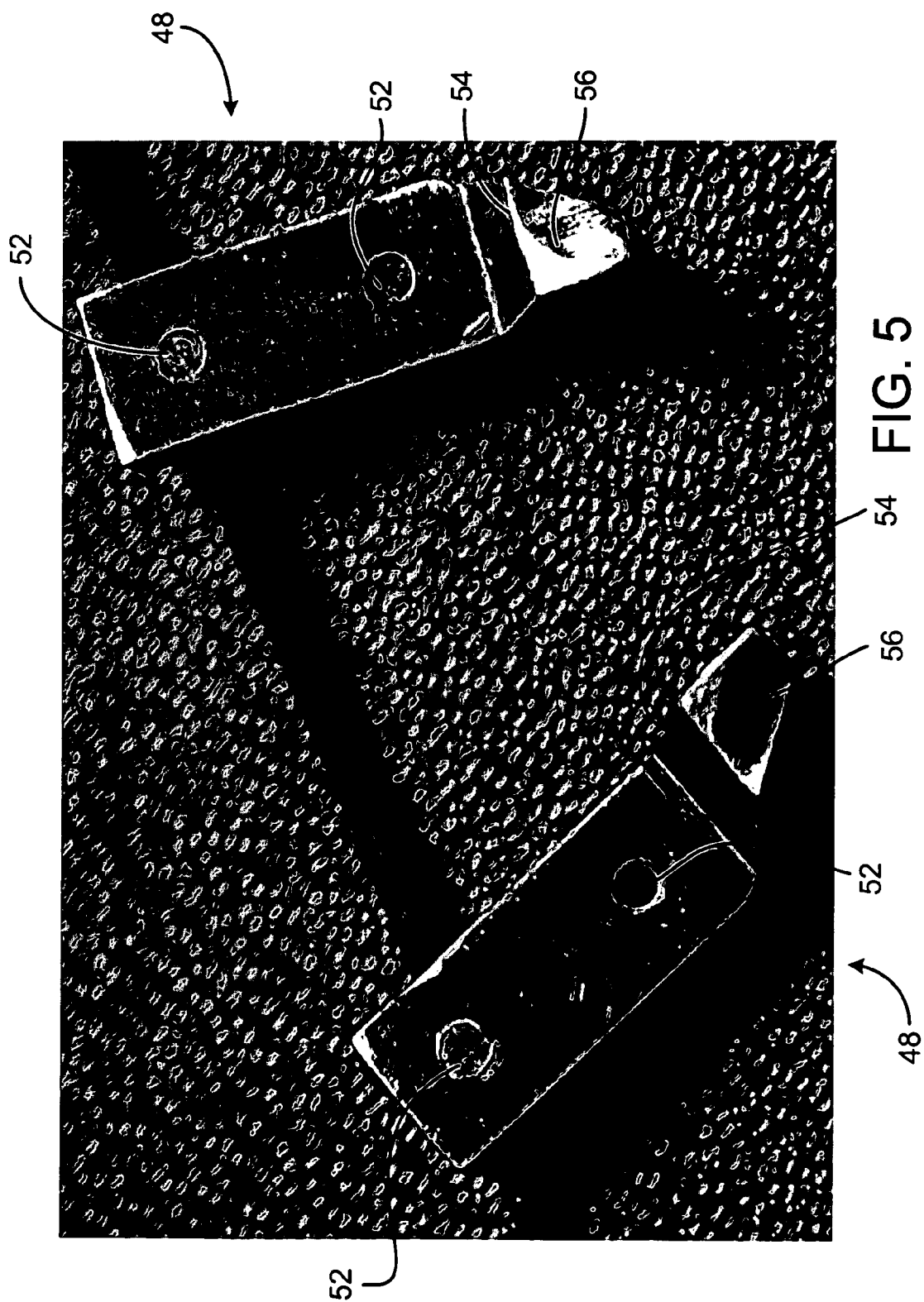
FIG. 5 is a schematic view of a pair of folding fingers used in one embodiment of the die.

FIG. 5 depicts two folding fingers 48 removed from the die 40. The folding fingers 48 are each attached to the die 40 by securing apertures 52. The securing apertures 52 are used to position the folding fingers 48 within the opening of the die 40. The outer edge 54 of each folding finger 48 defines a portion of the substantially cylindrical void 42. In some embodiments, each folding finger 48 may include a chamfer 56 applied to the trailing edge. This chamfer 56 minimizes or eliminates creases.

FIGS. 6a, 6b, 6c, 6d, 6e, and 6f depict embodiments for the face 44 of the die 40. The face 44 of the die 40 may be part of a face plate 60 as shown in FIGS. 6a and 6b. FIGS. 6a and 6b depict the top sides of embodiments of these face plates 60. FIGS. 6c, 6d, 6e, and 6f depict the bottom sides of embodiments of these face plates 60. FIGS. 6a, 6d, and 6f all depict face plates 60 having a partial countersink 62 on the leading edge of the elongated bore 46. FIGS. 6b, 6c, and 6e all depict face plates 60 having a full countersink 64 on the leading edge of the elongated bore 46. The full countersink 64 and the partial countersink 62 help to ensure that the first elongated side 34' of the separator material 26' is the first part of the separator material 26' to form against the mandrel. This ensures that folded sections 38 are radially outwardly disposed from the first wall section 34 formed from the first elongated side 34', which is placed above the side of the face 44 with the partial countersink 62 or full countersink 64 leading edge.

FIGS. 6c, 6d, 6e, and 6f further depict the bottom sides of face plates. As shown, some embodiments (FIGS. 6e and 6f) include counter bore extensions 66 along the bottom side of the leading edge while other embodiments do not include the counter bore extensions 66 (FIGS. 6c and 6d). The addition of counter bore extensions 66 may help to reduce the amount of wrinkling or creasing of the inner generally cylindrical body 26.

Referring back to FIG. 1, cathode 12 includes at least one cathode active material. In some embodiments, cathode 12 can further include at least one conductive aid and/or at least one binder. The electrolyte also is dispersed through cathode 12. The weight percentages provided herein with respect to components of cathode 12 are determined after the electrolyte has been dispersed through cathode 12.

In some embodiments, the cathode active material can be a manganese oxide ($MnO_2$). Other examples of cathode active materials include copper oxides (e.g., cupric oxide (CuO), cuprous oxide ($Cu_2O$)); copper hydroxides (e.g., cupric hydroxide ($Cu(OH)_2$), cuprous hydroxide (Cu(OH))); cupric iodate ($Cu(IO_3)_2$); $AgCuO_2$; $LiCuO_2$; $Cu(OH)(IO_3)$; $Cu_2H(IO_6)$; copper-containing metal oxides or chalcogenides; copper halides (e.g., $CuCl_2$); and/or copper manganese oxides (e.g., $Cu(MnO_4)_2$). Further examples of cathode active materials include cathode active materials that include nickel, such as a nickel oxyhydroxide (NiOOH). Additional examples of cathode active materials include cathode active materials including a pentavalent bismuth-containing metal oxide. In certain embodiments, cathode 12 can be porous. A porous cathode can include, for example, one or more of the above-described cathode active materials (e.g., $MnO_2$, NiOOH).

A conductive aid can increase the electronic conductivity of cathode 12. An example of a conductive aid is carbon particles, which can be any of the conventional carbon particles used in cathodes, including graphite particles. Cathode 12 may include, for example, from about three percent to about nine percent (e.g., from about four percent to about seven percent) carbon particles by weight. In some embodiments, cathode 12 can include from about four percent to about nine percent (e.g., from about four percent to about 6.5 percent) graphite particles by weight. Another example of a conductive aid is carbon fibers, such as those described in Luo et al., U.S. Pat. No. 6,858,349, and in Anglin, U.S. Patent Application Publication No. US 2002/0172867 A1, published on Nov. 21, 2002, and entitled "Battery Cathode". In certain embodiments, cathode 12 can include from about one percent by weight to about 10 percent by weight of total conductive aids, which may include more than one type of conductive aid.

Examples of binders include polyethylene powders, polyacrylamides, Portland cement and fluorocarbon resins, such as polyvinylidenefluoride (PVDF) and polytetrafluoroethylene (PTFE). Cathode 12 may include, for example, up to about two percent binder by weight (e.g., up to about one percent binder by weight). In certain embodiments, cathode 12 can include from about 0.1 percent to about two percent (e.g., from about 0.1 percent to about one percent) binder by weight.

Cathode 12 can include other additives. Additives are disclosed, for example, in Mieczkowska et al., U.S. Pat. No. 5,342,712. In some embodiments, cathode 12 can include titanium dioxide ($TiO_2$). In certain embodiments, cathode 12 can include from about 0.1 percent to about two percent (e.g., from about 0.2 percent to about two percent) $TiO_2$ by weight.

The electrolyte that is dispersed through cathode 12 (and/or the electrolyte used in the rest of battery 10) can be any of the electrolytes used in batteries. In some embodiments, cathode 12 can include from about five percent to about eight percent (e.g., from about six percent to about seven percent) electrolyte by weight. The electrolyte can be aqueous. An aqueous electrolyte can be an alkaline solution, such as an aqueous hydroxide solution (e.g., NaOH, KOH), or a mixture of hydroxide solutions (e.g., NaOH/KOH). For example, the aqueous hydroxide solution can include from about 33 percent by weight to about 40 percent by weight of the hydroxide material, such as about 9N KOH (about 37 percent by weight KOH). In some embodiments, the electrolyte can also include up to about four percent by weight (e.g., about two percent by weight) of zinc oxide.

The electrolyte can include other additives. As an example, the electrolyte can include a soluble material (e.g., an aluminum material) that reduces (e.g., suppresses) the solubility of the cathode active material in the electrolyte. In certain embodiments, the electrolyte can include one or more of the following: aluminum hydroxide, aluminum oxide, alkali metal aluminates, aluminum metal, alkali metal halides, alkali metal carbonates, or mixtures thereof. Electrolyte additives are described, for example, in Eylem et al., U.S. Patent Application Publication No. US 2004/0175613 A1, published on Sep. 9, 2004, and entitled "Battery".

Housing 18 can be any housing commonly used in batteries. As shown, housing 18 is a cylindrical housing. In some embodiments, housing 18 can be made of a metal or a metal alloy, such as nickel, nickel-plated steel (e.g., nickel-plated cold-rolled steel).

In some embodiments, housing 18 can include an inner metal wall and an outer electrically non-conductive material such as heat-shrinkable plastic. Optionally, a layer of conductive material can be disposed between the inner wall and cathode 12. The layer may be disposed along the inner surface of the inner wall, along the circumference of cathode 12, or both. This conductive layer can be formed, for example, of a carbonaceous material (e.g., graphite). Such materials include, for example, LB1000 (Timcal), Eccocoat 257 (W.R. Grace and Co.), Electrodag 109 (Acheson Colloids Co.), Electrodag 112 (Acheson), Vamiphite 5000 (Nippon), and EB0005 (Acheson). Methods of applying the conductive layer are disclosed, for example, in Canadian Patent No. 1,263,697.

Anode 14 can be formed of any of the zinc materials used in battery anodes. For example, anode 14 can be a zinc gel that includes zinc metal particles, a gelling agent, and minor amounts of additives, such as gassing inhibitor. Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed, for example, in Chalilpoyil et al., U.S. Pat. No. 4,777,100. In addition, a portion of the electrolyte is dispersed throughout the anode.

Seal 22 can be made of, for example, a polymer (e.g., nylon).

Cap 24 can be made of, for example, a metal or a metal alloy, such as aluminum, nickel, titanium, or steel.

In some embodiments, battery 10 can include a hydrogen recombination catalyst to lower the amount of hydrogen gas that may be generated in the cell by anode 14 (e.g., when anode 14 includes zinc). Hydrogen recombination catalysts are described, for example, in Davis et al., U.S. Pat. No. 6,500,576, and in Kozawa, U.S. Pat. No. 3,893,870. Alternatively or additionally, battery 10 can be constructed to include pressure-activated valves or vents, such as those described in Tomantschger et al., U.S. Pat. No. 5,300,371.

Weight percentages of battery components provided herein are determined after the electrolyte solution has been dispersed in the battery.

Battery 10 can be a primary electrochemical cell. Battery 10 can be of any of a number of different voltages (e.g., 1.5V), and/or can be, for example, a AA, AAA, AAAA, C, or D battery.

Methods for assembling electrochemical cells are described, for example, in Moses, U.S. Pat. No. 4,279,972; Moses et al., U.S. Pat. No. 4,401,735; and Kearney et al., U.S. Pat. No. 4,526,846.

A number of embodiments of the invention have been described. Nevertheless, it will be understood that various modifications may be made without departing from the spirit and scope of the invention. For example, a generally cylindrical body having more than two wall sections is also contemplated. Also, a separator may include any number of generally cylindrically shaped bodies. Accordingly, other embodiments are within the scope of the following claims.

What is claimed is:

1. An alkaline battery comprising:
   (a) a cathode;
   (b) an anode;
   (c) a separator between the anode and the cathode, the separator comprising a first generally cylindrical body that includes a first wall section, a second wall section, and a first folded section, wherein the first folded section is radially outwardly disposed from the first wall section, and wherein the first folded section is radially inwardly disposed from the second wall section; and
   (d) an alkaline electrolyte contacting the anode and the cathode.

2. The battery of claim 1, wherein the first generally cylindrical body further comprises a second folded section that is radially outwardly disposed from at least one of the first and second wall sections.

3. The battery of claim 1, wherein the first generally cylindrical body further comprises a second folded section that is radially outwardly disposed from at least one of the first and second wall sections and is radially inwardly disposed from the other wall section.

4. The battery of claim 3, wherein the first and second folded sections are both radially outwardly disposed from the first wall section and radially inwardly disposed from the second wall section.

5. The battery of claim 1, wherein the first generally cylindrical body further comprises a closed end.

6. The battery of claim 5, wherein said first folded section is folded substantially perpendicular to the plane of the closed end.

7. The battery of claim 6, wherein the first folded section comprises a side edge defined by a fold, the side edge forming an angle of between 45 and 60 degrees with the plane of the closed end.

8. The battery of claim 1, wherein the first generally cylindrical body comprises a single continuous piece of material.

9. The battery of claim 8, wherein the single continuous piece of material has a thickness of less than 300 microns.

10. The battery of claim 1, wherein the separator further comprises a second generally cylindrical body surrounding the first generally cylindrical body.

11. The battery of claim 10, wherein the first generally cylindrical body comprises a continuous piece of porous material and the second generally cylindrical body comprises a continuous piece of non-porous material.

12. The battery of claim 10, wherein the first generally cylindrical body comprises a continuous piece of non-porous material and the second generally cylindrical body comprises a continuous piece of non-porous material.

13. The battery of claim 1, wherein a portion of said first and second wall sections overlap.

14. The battery of claim 13, wherein said first and second wall sections overlap by at least 1 mm.

15. An alkaline battery comprising:
   (a) a cathode;
   (b) an anode;
   (c) a separator between the anode and the cathode,
      the separator comprising a inner generally cylindrical body and a outer generally cylindrical body,
      the inner generally cylindrical body comprising a continuous piece of porous material and the outer generally cylindrical body comprising a continuous piece of non-porous material,
      the inner generally cylindrical body comprising a first wall section, a second wall section, a closed end, a first folded section, and a second folded section, wherein the first and second folded sections are radially outwardly disposed from the first wall section, and wherein the first and second folded sections are radially inwardly disposed from the second wall section; and
   (d) an alkaline electrolyte contacting the anode and the cathode.

* * * * *